(No Model.) 2 Sheets—Sheet 1.
J. T. BOLTON.
HARNESS OPERATING MECHANISM FOR LOOMS.
No. 536,010. Patented Mar. 19, 1895.
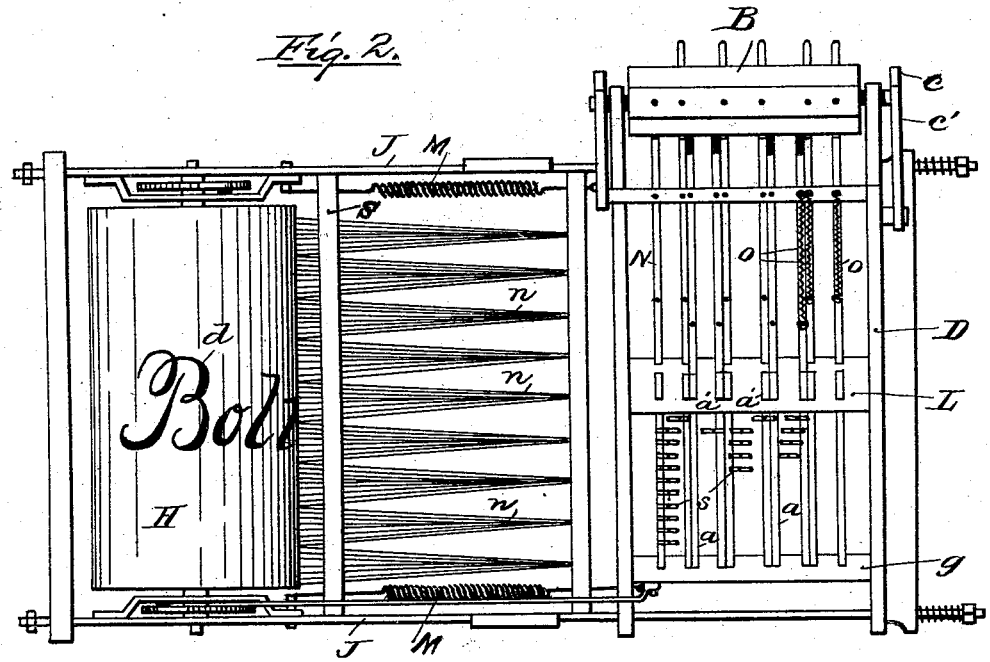
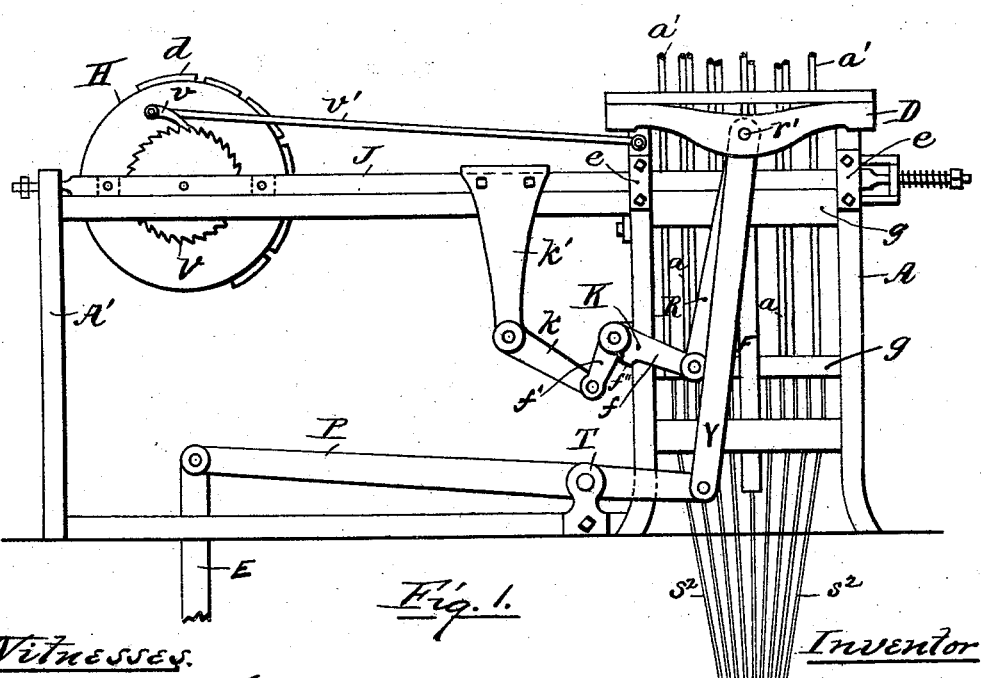
Witnesses.
Charles Hannigan.
E. B. Read.
Inventor
John T. Bolton.
by Benj. Arnold
Atty.

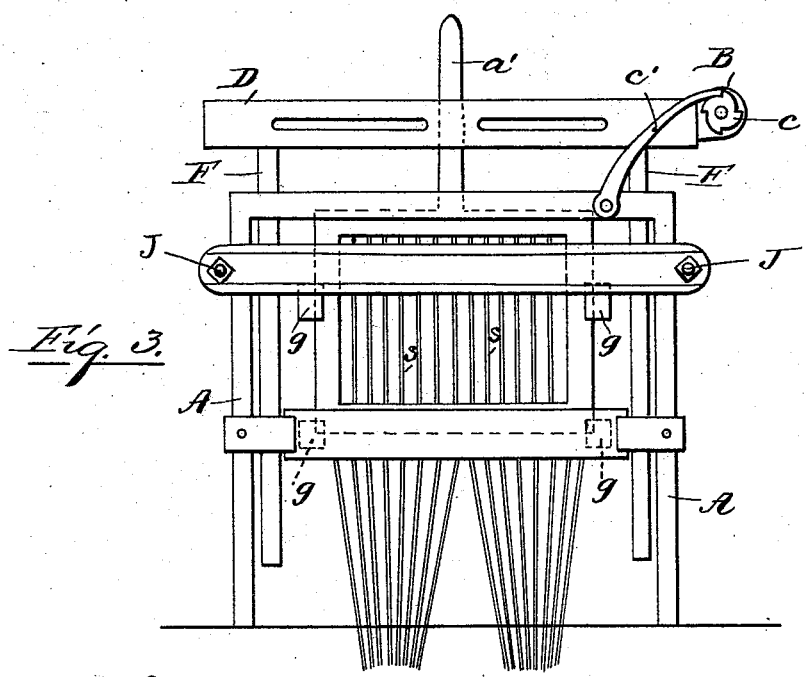
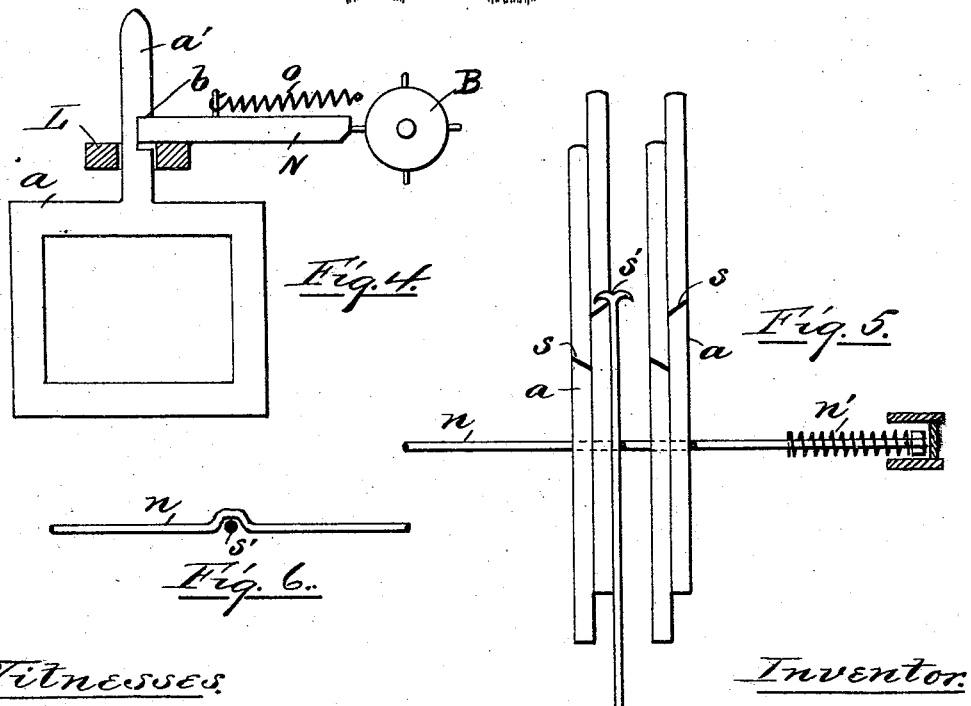

UNITED STATES PATENT OFFICE.

JOHN T. BOLTON, OF FALL RIVER, MASSACHUSETTS, ASSIGNOR OF ONE-THIRD TO GEORGE GRIME, OF SAME PLACE.

HARNESS-OPERATING MECHANISM FOR LOOMS.

SPECIFICATION forming part of Letters Patent No. 536,010, dated March 19, 1895.

Application filed April 17, 1894. Serial No. 507,827. (No model.)

*To all whom it may concern:*

Be it known that I, JOHN T. BOLTON, of Fall River, in the county of Bristol and State of Massachusetts, have invented certain new and useful Improvements in Harness-Operating Mechanism for Looms; and I do hereby declare that the following is a full, clear, and exact description thereof, reference being had to the accompanying drawings, and to the letters of reference marked thereon, which form a part of this specification.

This invention relates to that class of looms intended for weaving figured goods, and comprises an auxiliary mechanism for producing variations and independent figures in the regular ground pattern, by means of independent griffs, a pattern cylinder to select the griffs and an auxiliary pattern cylinder to select the harness wires for the griffs.

It is fully illustrated in the accompanying drawings.

Figure 1, represents a side elevation of the apparatus that controls the warp threads. Fig. 2, is a top view of the same mechanism shown in Fig. 1. Fig. 3, is an elevation of the right-hand end of the mechanism shown in Figs. 1 and 2. Fig. 4, is a side elevation of one of the griffs or griff bars, with the sliding bar that raises it and the pin roll that moves the sliding bar to catch the griff. Fig. 5, represents four of the griffs, with a double hooked harness wire between the griffs, and the wire that controls the hook to decide on which griff it shall catch. Fig. 6, is a top view of the junction of a wire $n$, and hook wire $s'$.

The object of this invention is to produce when weaving a regular pattern, an independent figure at intervals thereon, this figure to consist of a reversal of the movements of the warp thread from back to front and from front to back of the regular pattern.

The machine consists of a set of Jacquard hook harness wires with a griff movement to operate them; but this griff instead of having all its bars joined in one frame, so as to all rise and fall together, has each bar made separate from the others, and capable of moving up and down independently. These griffs are arranged in pairs with the harness wire between each two. The heads of the wire consist of a double hook $s'$, as in Fig. 5, one facing a griff on one side and the other hook facing the griff on the other side, and capable of catching on either griff, according to which way the wire is pushed. Each griff is raised separately by its sliding bar, when such bar is pushed in, and the bars $g$, $g$, have grooves made in them for the griffs to slide in.

A, is the frame that holds the moving mechanism.

D, is a frame placed above the frame A, and held on slide rods F, that move in ways in the frame A. This frame D, has a pattern cylinder B, held in bearings on one side of the frame, and has a ratchet wheel $c$, fast on one end of its shaft, and a pawl $c'$, that is pivoted to the frame A. A bar L, is placed across the frame D, with openings through it to receive the catch bar $a'$, of the griffs. A series of sliding bars N, one for each griff, are arranged to rest on the bar L, and just reach to the cylinder B.

Each griff consists of a rectangular frame $a$, having a bar $a'$, extending up from the middle of the upper side. The bar $a'$, has a recess or notch $b$, made in one edge, to receive the end of the sliding bar N, when that bar is pushed in by a pin in the cylinder B, (see Fig. 4) and when not pushed in by a pin, the bars N, are drawn out by a small spiral spring $o$, one for each bar, some of which are shown in Fig. 1. The edges of the griffs where the hooks $s'$ catch, are beveled off to form an edge toward the hooks. (See Fig. 5.) A series of horizontal wires $n$, pass between the harness wires $s'$, with loops for the wires $s'$, to pass through (see Fig. 6) and cause them to move over from one griff to the other, as may be required. When not moved by a pattern, the springs $n'$, will hold the wires $n$, to the left, so the hook on the end of wire $s'$, will catch on the griff on that side. So long as the wires $n$, are left free, the pattern woven will be that controlled by the pins in the pattern cylinder B, which push in the sliding bars N, to raise the proper griffs.

The cylinder H, which has the auxiliary pattern $d$, which is an exact copy of the design or lettering intended to be produced on the cloth made in high relief on its surface, is held in the bearings in a sliding frame J, which slides in bearings e, in the frame A, and in the end frame A'. This pattern I construct of several thicknesses of paper cut into the form of the pattern or letters and pasted together and faced with an outside covering of tin cut to agree with the paper. This pattern is secured to the face of the cylinder with suitable nails, or it may be cast of soft metal that will bend around the surface of the cylinder. A thickness of three-eighths of an inch, more or less, I have found very suitable for this pattern. The frame J, is drawn toward the frame A, by two strong spiral springs M, M, and is moved away for a short interval, to allow the pattern cylinder to turn by the double lever K, which is composed of two levers held on the same pivot. The longer lever $f$, is at liberty to move up as the frame D, and the connecting bar R rise without the short lever $f'$; but at the last part of its motion downward, the projection $f'$ on the under side of the lever $f$, will strike against the lever $f'$, and push the frame J, back for a moment, by the connection $k$ and bracket $k'$, attached to the frame J. This arrangement is the same on both sides of the machine. A bar S, is placed from one side of the frame A', to the other, just inside the cylinder H, to hold the wires $n$, $n$, which are spread out in a single row close together, to occupy in width the pattern surface of the cylinder H. The wires $n$, $n$, are at rest at all times, except when in contact with the pattern $d$, and are made of the proper length to have their ends just clear the surface of the cylinder H, when that cylinder is moved clear to the right with the frame J, at which time, as before stated, the wires $n$, are pressed toward the pattern cylinder H by the springs $n'$, so as to hold the wires $s'$, over against the griff to the left of each row of the wires $s'$.

The lever P, that raises and lowers the frame D, receives motion from a crank on the crank shaft of the loom, by the connecting rod E. This lever is held in bearings T, on each side of the frame A', and is connected by a bar Y, on each side of the machine, to a pivot in the frame D, so that at each pick of the loom, the frame D, will rise and fall, and with it the cylinder B, which, by means of the pawl $c'$, pivoted to the stationary frame A, will turn the ratchet wheel $c$, and cylinder B, one row of the pins at each rise and fall of the frame D, and cause the proper sliding bars N, to engage with the bars $a'$, of the griffs, according as the bars are struck by pins in the cylinder B.

As before stated, at each descent of the frame D, the frame J, and cylinder H, are moved away from the frame A, for a moment, by the levers $f, f'$, and are drawn toward the frame A, again, by the springs M, M, as the frame D, begins to rise and release the lever $f'$, which motion of the cylinder causes it to turn one notch of the ratchet wheel V, fast on its shaft, through the pawl $v$, held on the rod $v'$, secured by a stud to the stationary frame A.

As before stated, so long as the wires $n$, are not operated by the raised pattern on the cylinder H, the harness wires $s'$, will be held over so as to catch on the griff to the left of the wires, and supposing in this situation, the loom, by the arrangement of the pins in the cylinder B, was weaving a twill of three threads up and one thread down, in two or more colors, then when the pattern $d$, was brought up by the turning of the cylinder H, those wires $n$, that came in contact with the pattern $d$, would be pushed back, so as to cause the harness wires $s'$, controlled by them, to bend over and catch on the griff to the right of them. This would reverse the motion of all the wires $s'$, under the influence of the pattern $d$, and cause that pattern to be woven in a twill of one thread up and three threads down.

Having thus described my improvements, I claim as my invention—

1. A series of griff plates or bars moving independently of each other, a pattern cylinder and bars to select said griffs to be moved, in combination with harness wires having a hook on each side with means for raising and lowering each griff, and a pattern device to move the harness wires to engage with the griffs, substantially as described.

2. A series of griff plates or bars moving independently of each other and provided on their upper sides with upright pieces having notches in them, in combination with a series of sliding bars arranged to catch into the said notches in the upright parts of said griffs to raise them, a pattern cylinder having pins arranged to push said sliding bars into engagement with the griffs, a set of harness wires having a hook on each side of their upper ends, a pattern device to move the harness wires to engage with the griffs, and mechanism to raise and lower the griffs, substantially as described.

3. A series of independent griff plates or bars, a pattern cylinder and bars to select said griffs to be moved in combination with a series of harness wires having a hook on each side, with means for raising and lowering said griffs, and a pattern device consisting of a cylinder having a raised pattern thereon, a series of wires, one for each harness wire, having their outer ends arranged in a single close row to be moved by said raised pattern, and means for moving the pattern toward and from said row of wires, substantially as described.

4. A series of independent griff plates or bars provided on their upper sides with upright pieces having notches therein in combination with a series of sliding bars, one for each griff, arranged to catch into the said notches in the upright pieces of said griffs to raise them, a pattern cylinder having pins arranged to push said sliding bars into engagement with the griffs, a set of harness wires, each having a hook on each side of its upper end, a pattern device to move the harness wires to engage with the griffs, consisting of a cylinder having a raised pattern thereon, a series of wires, one for each harness wire having their outer ends arranged in a single close row to be moved by said raised pattern, and means for moving the pattern toward and from said row of wires, substantially as described.

JOHN T. BOLTON.

Witnesses:
 BENJ. ARNOLD,
 E. B. READ.